F. J. McEWAN.
FISH TRAP.
APPLICATION FILED NOV. 7, 1908.
928,143.
Patented July 13, 1909.
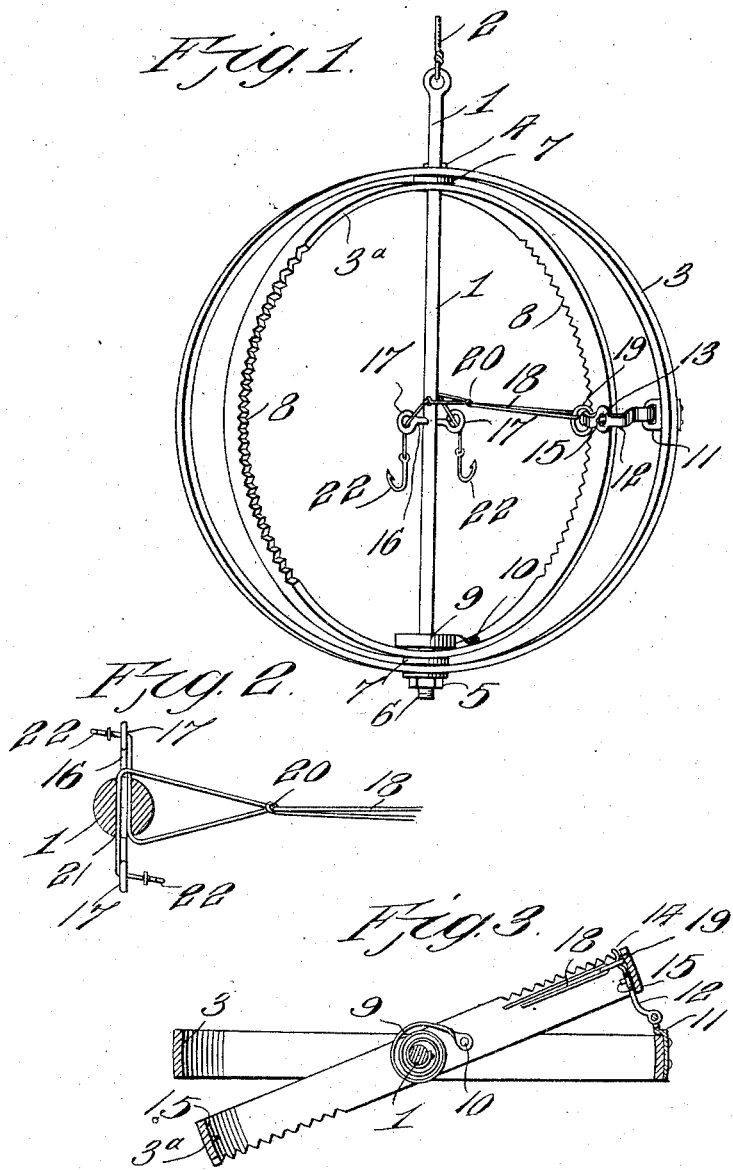
Witnesses
Wm B. McDowell
Inventor
Frank James McEwan,
By Victor J. Evans
Attorney

UNITED STATES PATENT OFFICE.

FRANK JAMES McEWAN, OF CHICAGO, ILLINOIS.

FISH-TRAP.

No. 928,143.

Specification of Letters Patent.

Patented July 13, 1909.

Application filed November 7, 1908. Serial No. 461,529.

*To all whom it may concern:*

Be it known that I, FRANK JAMES MC-EWAN, a citizen of the United States of America, residing at Chicago, in the county of Cook and State of Illinois, have invented new and useful Improvements in Fish-Traps, of which the following is a specification.

This invention relates to fish traps, and one of the principal objects of the same is to provide a simple and convenient device for fishermen which will catch a fish should he nibble at the bait.

Another object of the invention is to provide a spring trap which will close upon a fish whenever the bait is nibbled at.

These and other objects may be attained by means of the construction illustrated in the accompanying drawing, in which,—

Figure 1 is a side elevation of a device made in accordance with my invention. Fig. 2 is a detail section, showing the arrangement of the fish hooks and the trigger line. Fig. 3 is a horizontal sectional view.

Referring to the drawing, the numeral 1 designates a shaft connected to the lower end of a fish line 2. A sheet metal ring 3 is connected to the shaft by means of a pin 4 and a nut 5 connected to the threaded end 6 of the shaft. An inner ring 3ª is also connected to the shaft 1 inside the ring 3, said inner ring being separated from the outer ring by means of washers 7. The opposite side edges of the ring 3ª are provided with teeth 8. A spiral spring 9 is connected at one end to the shaft 1, and its opposite end is connected to the inner ring 3ª, as at 10. Connected to the outer ring 3 is a loop 11, and pivotally connected to said loop is a trigger 12 having an eye 13 and a bent outer end 14. A stud 15 is secured to the inner ring 3ª.

Extending through the shaft 1 is an eye bar 16 provided with oppositely disposed eyes or loops 17. A trigger line or cord 18 is provided with a ring 19 adapted to be engaged with the end of the trigger 12, said line being provided with a knot 20, and the line being separated from the knot and the separate strands extending from opposite directions through an opening 21 in the shaft 1, said strands thence extending through the eyes 17 and having connected to the ends fish hooks 22.

The operation of my invention may be briefly described as follows:—The hooks 32 having been baited and the inner ring 3ª having been moved around the shaft 1 against the tension of the spring 9, the trigger 12 is engaged with the stud 15. The ring 19 is then engaged with the trigger 12, and the device is then thrown into the water and suspended from the fish line 2. A fish that will nibble at the bait on the hooks 22 will pull the trigger and disconnect it from the stud 15. Then the ring 3ª will rotate on the shaft 1 and clamp the fish between the teeth 8 and the edge of the ring 3 upon either side of the shaft.

My invention is of simple construction, is efficient in operation, can be manufactured at low cost and provides means whereby a fish will be caught at the slightest nibble of the bait upon the hooks.

I claim:—

A fish trap comprising a shaft having an opening therein, a ring connected to the shaft, an inner ring mounted on the shaft and provided with a spring connected at one end to the shaft and at the opposite end to said ring, a trigger pivoted to the outer ring, a stud on the inner ring engaged by said trigger, a trigger line provided with a ring for engaging said trigger, a bar connected to said shaft, said bar having eyes therein, said line being extended through the opening in said shaft and through the eyes of the bar, and bait hooks connected to said line.

In testimony whereof I affix my signature in presence of two witnesses.

FRANK JAMES McEWAN.

Witnesses:
ROBERT R. PHILLIPS,
D. FARLEY.